United States Patent
Kaimal

(10) Patent No.: US 12,088,498 B2
(45) Date of Patent: Sep. 10, 2024

(54) METHODS AND SYSTEMS FOR DETERMINING PREFERRED LINKED NETWORK PATH BETWEEN TWO NETWORK DEVICES

(71) Applicant: Karunesh Rama Kaimal, Fremont, CA (US)

(72) Inventor: Karunesh Rama Kaimal, Fremont, CA (US)

(73) Assignee: Karunesh Rama Kaimal, Brentwood, CA (US)

( * ) Notice: Subject to any disclaimer, the term of this patent is extended or adjusted under 35 U.S.C. 154(b) by 276 days.

(21) Appl. No.: 17/591,927

(22) Filed: Feb. 3, 2022

(65) Prior Publication Data

US 2023/0246960 A1    Aug. 3, 2023

(51) Int. Cl.
*H04L 45/00*    (2022.01)
*H04L 45/02*    (2022.01)
*H04L 45/745*    (2022.01)

(52) U.S. Cl.
CPC .............. *H04L 45/70* (2013.01); *H04L 45/04* (2013.01); *H04L 45/745* (2013.01)

(58) Field of Classification Search
None
See application file for complete search history.

(56) References Cited

U.S. PATENT DOCUMENTS

| | | | |
|---|---|---|---|
| 7,584,298 B2 | 9/2009 | Klinger et al. | |
| 8,160,056 B2* | 4/2012 | Van der Merwe | H04L 45/04 709/239 |
| 8,677,489 B2 | 3/2014 | Strebe et al. | |
| 9,929,949 B2 | 3/2018 | Mahadevan et al. | |
| 11,121,967 B2 | 9/2021 | Li | |
| 2010/0061272 A1* | 3/2010 | Veillette | H04W 40/005 370/254 |
| 2011/0013517 A1* | 1/2011 | So | H04L 45/04 370/238 |
| 2011/0058563 A1* | 3/2011 | Saraph | H04L 47/785 370/401 |

* cited by examiner

*Primary Examiner* — Xavier S Wong

(57) ABSTRACT

Embodiments of the present disclosure provide systems and methods for determining linked network path using service-oriented protocol. Method implemented at first network device associated with first autonomous system (AS) includes accessing OP routing table and service information relating to organization associated with first AS, service information indicating service type associated with organization. Method includes sending service messages to establish communication session with second network device, communication session indicating probable network paths. The method includes calculating connection metric value for each of probable network paths based on connection parameters, and identifying linked network path from probable network paths based on connection metric values. The method includes routing organization data packets to the second network device via the linked network path.

9 Claims, 7 Drawing Sheets

METHODS AND SYSTEMS FOR DETERMINING PREFERRED LINKED NETWORK PATH BETWEEN TWO NETWORK DEVICES

TECHNICAL FIELD

The present disclosure relates to a network routing protocol and, more particularly to, methods and systems for selecting or determining a preferred linked network path between network devices that are configured with a service-oriented protocol (e.g., organization transit gateway protocol).

BACKGROUND

With the growth of the Internet, there has been tremendous growth in various kinds of devices connected to the Internet. This leads to an increase in the number of routes i.e., a path across which a data packet travels on a network. To manage the increasing network traffic, routing protocols are deployed that specify how network devices in the network may communicate with each other to distribute routing information. The routing information enables the network devices to select routes for data packet communication.

To keep a profusion of the routes within the communication network, autonomous systems are deployed. An Autonomous System (AS) is a network or group of networks under a single administration and having a common routing policy. The autonomous system is administered and maintained by an Internet Service Provider (ISP). For example, customer networks or organization networks, such as universities or corporations, may connect to the Internet via a corresponding autonomous system, and the AS may route the network traffic originating from the organization networks to network destinations that may be in the same ISP or may be reachable through other ISPs.

Typically, an autonomous system includes one or more network elements that may be positioned at the edge of the AS and that operate as a point of ingress and egress for network traffic. For example, such network elements may be edge routers or border routers. Further, other network elements, such as forwarder routers and service routers may also be included in the AS. In order to communicate network traffic originating at an organization node in the AS, the traffic may have to be routed through one or more autonomous systems. In this regard, the network elements of one or more autonomous systems may have to establish a communication interface for transmitting data packets over it.

The communication network is designed to be highly available for dependable and continuous operation without failing. In this regard, the communication network may include multiple paths among two network elements, and sometimes multiple components may also be included in the two network elements to facilitate such multiple paths. In this manner, redundant paths and redundant components enable the communication network to operate even after the occurrence of a fault with very little downtime. High availability in the communication network offers a high level of operational performance and quality over a relevant time period. Further, when two network elements are not directly connected, multiple different routes may exist between the two network elements. For example, different routes may exist to reach a destination AS network or destination router from a source AS network or a source router. The different routes may be facilitated via different AS networks or routers positioned between the source AS network and the destination AS network.

For exchanging data packets, a single path from the multiple high availability paths and different routes may have to be selected. Determining the best path may involve the evaluation of multiple paths to the same destination AS network and selecting an optimum or shortest path to reach the destination AS network. Whenever multiple paths to the destination AS network exist, each path may use a different exit interface on the source router to reach the destination AS network. Conventionally, the best path is selected by a routing protocol based on a value or a metric that the routing protocol may use to determine a distance to reach the destination AS network. The metric is a quantitative value used to measure the distance to the destination AS network. The best path to the destination AS network is the path with the lowest metric. However, the conventional routing protocol fails to take into consideration various routing variables while determining the best path based on distance. Such routing protocols may be, for example, load on the network elements, faults, and so forth. As a result, routing data packets on a path selected based on distance may not enable optimum and efficient communication.

Recently, dynamic routing protocols may use their own rules and metrics to build and update routing tables. The routing protocol generates a value, or a metric, for each path through the network. Metrics can be based on either a single characteristic or several characteristics of a path. Some routing protocols can base route selection on multiple metrics, combining them into a single metric. The multiple metrics may include, for example, hop count, bandwidth, delay, load, and reliability. However, the existing routing protocols may still fail to consider the quality of service required by an organization operating within an autonomous system. In particular, the conventional routing protocols fail to select a path for transmitting an organization data packet such that the selected path may reliably meet the organization's requirement for routing. Therefore, the quality of service for the organizations is affected. This may further affect user experience.

In certain cases, routing of data packets based on conventional routing protocol may lead to long paths for transmission of data packets resulting in constant delays. For example, such delays may further affect sales conversion rates, impact the quality of service, and cause potential user frustration. In addition, there may be packet loss due to inefficient path selection. Due to any packet loss, the quality of a file, such as a video conference, video streaming, and real-time document collaboration, may be severely negatively impacted. Furthermore, the conventional routing protocols may not take into consideration any malfunctioning or inconsistencies of network elements during metric calculation. As a result, the user may be unable to access data until the routing equipment is restored, thereby causing delay and user frustration There is a need to overcome the drawbacks of the conventional routing protocol and enable organizations to route data packets in an optimum and seamless manner.

SUMMARY

Various embodiments of the present disclosure provide methods and systems for determining linked network paths for routing of organization data packets using a service-oriented protocol.

In one embodiment, a computer-implemented method is disclosed. The computer-implemented method is implemented at a first network device of a first autonomous system. The method includes accessing organization packet (OP) routing information and service information relating to an organization associated with the first autonomous system. The OP routing information and the service information are accessed based at least on an organization identifier of the organization. The service information indicates a service type associated with the organization. The method includes sending a plurality of service messages to establish a communication session with a second network device associated with a second autonomous system. The communication session indicates a plurality of probable network paths. The method includes calculating a connection metric value associated with each network path of the plurality of probable network paths based, at least in part, on a set of connection parameters. The method further includes identifying a linked network path from the plurality of probable network paths based, at least in part, on the connection metric value associated with each network path of the plurality of probable network paths. The method includes routing organization data packets to the second network device via the linked network path, upon identifying the linked network path.

In another embodiment, a device is disclosed. The device includes a memory, an interface, and a processor. The processor is communicably coupled with the interface and the memory. The memory stores instructions that configure the processor to perform at least access organization packet (OP) routing information and service information relating to an organization associated with a first autonomous system. The OP route information and the service information are accessed based at least on an organization identifier of the organization. The service information indicates a service type associated with the organization. The processor is configured to send a plurality of service messages to establish a communication session with a network device associated with a second autonomous system. The communication session indicates a plurality of probable network paths. The processor is configured to calculate a connection metric value associated with each network path of the plurality of probable network paths based, at least in part, on a set of connection parameters. The processor is configured to identify a linked network path from the plurality of probable network paths based, at least in part, on the connection metric value associated with each network path of the plurality of probable network paths. The processor is configured to route organization data packets to the network device via the linked network path, upon identifying the linked network path.

In yet another embodiment, a non-transitory machine-readable storage medium is disclosed. The non-transitory computer-readable storage medium provides instructions that, if executed by a processor of a device acting as a first organization transit gateway protocol (OTGP) network device associated with a first autonomous system, cause the processor to perform operations. The operations include accessing organization packet (OP) routing information and service information relating to an organization associated with the first autonomous system. The OP routing information and the service information are accessed based at least on an organization identifier of the organization. The service information indicates a service type associated with the organization. The operations include sending a plurality of service messages to establish a communication session with a second OTGP network device associated with a second autonomous system. The communication session indicates a plurality of probable network paths. The operations include calculating a connection metric value associated with each network path of the plurality of probable network paths based, at least in part, on a set of connection parameters. The operations include identifying a linked network path from the plurality of probable network paths based, at least in part, on the connection metric value associated with each network path of the plurality of probable network paths. The operations further include routing organization data packets to the second OTGP network device via the linked network path, upon identifying the linked network path.

BRIEF DESCRIPTION OF THE FIGURES

The following detailed description of illustrative embodiments is better understood when read in conjunction with the appended drawings. To illustrate the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers.

DETAILED DESCRIPTION

Figure 1:
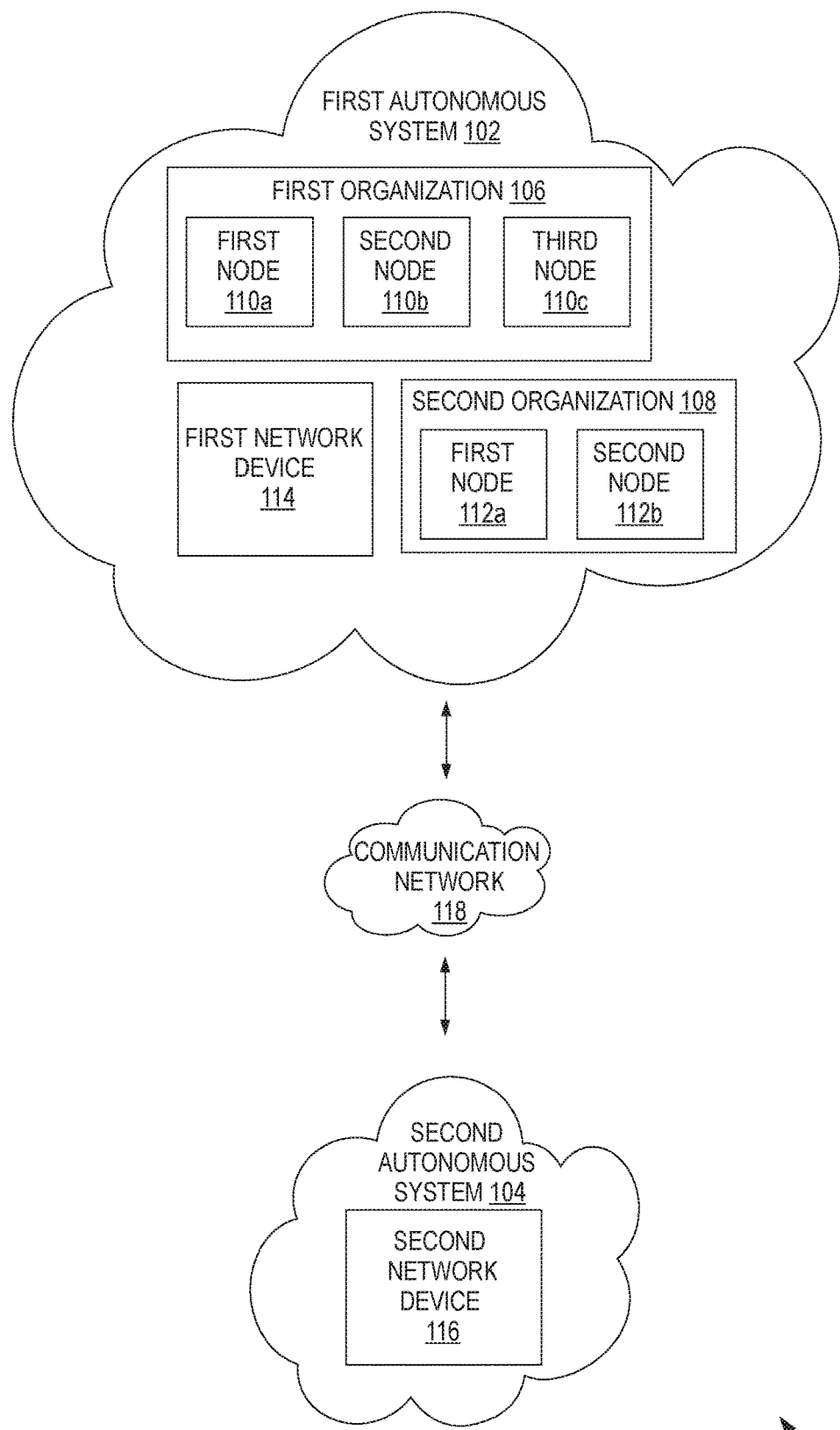
FIG. 1 illustrates an exemplary representation of an environment related to at least some example embodiments of the present disclosure.

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Typically, network device vendors or organizations purchase a security appliance or hardware for connectivity. For example, a single organization may be operating from two different sites. In such a case, the organization may have to purchase two security appliances for the two sites of the organization. In an example, the security appliance may be a firewall. Further, to ensure high redundancy, two pair of security appliances may have to be deployed on each site of the organization. Deployment of such large numbers of security appliances may be expensive. In operation, through these security appliances, the organization initiates to establish a linked network path. For example, the linked network path may be based on Internet Protocol Security (IPSec) configuration. In phase 1 of establishing an IPSec tunnel, a secure channel may be established between two participating electronic devices, from the two different sites, to negotiate IPSec security association (SA) parameters. In phase 2 of establishing the IPSec tunnel, the two electronic devices negotiate the IPSec SA for authenticating data traffic that will flow through the tunnel. Moreover, a service of encryption of data packets to be communicated between the sites of the organization is managed by the security appliance.

Owing to this set-up of security appliances in the organization, BGP is only used to connect two sites of an organization serviced by corresponding Internet Service Providers (ISPs). However, BGP does not provide any data security function or any service, such as encryption. Therefore, overheads may be added on each data packet (or IP packet) originating from the organization's security appliance which results in low data rate transfer with no real-time applications usage. The IPSec encapsulation or encryption overhead, along with the IP and frame overhead, may cause a resulting ESP data packet to exceed the maximum transmission unit (MTU) of the physical interface, which causes fragmentation. Fragmentation results in increased use of bandwidth and device resources.

The term "Internet Service Provider (ISP)", used throughout the description refers to an organization that may enable web access and other services, such as email service, domain registration, web hosting, and browser services, to organizations and individuals consumers. The users of ISP offerings are referred to herein as 'customers' of the ISP. In many scenarios, customers of an ISP may be an organization or users associated with an organization. In such cases, organizations may register with the ISP to avail services relating to accessing, using, or participating on the Internet. For example, the ISP may be a tier 2 or a tier 3 ISP. An ISP may include multiple autonomous systems.

The term "autonomous system (AS)", used throughout the description refers to a set of Internet routable IP prefixes belonging to a network that may be managed, controlled, and supervised by an administrative entity. The administrative entity of the autonomous system may be the ISP. The AS may control a collection of connected routing prefixes that represent different IP addresses, based on a common routing policy defined by the ISP. For example, an autonomous system may be assigned an autonomous system number (ASN) for routing of data packets to, from, and/or through the autonomous system. An AS may form a communication network including routing nodes for routing data packet flows to the correct destination address. The AS may be an Internet Service Provider, an organization, or an entire corporate network, including multiple locations (IP addresses).

The term "network device", used throughout the description, refers to networking hardware or an electronic device that may be required for communication and interaction between devices on a computer network. The network device may be a router, specifically, an organization transit gateway protocol (OTGP) router that connects an AS to other autonomous systems maintained and controlled by the same ISP or different ISP. Specifically, the network device may mediate data transmission on a computer network.

Overview

Various embodiments of the present disclosure provide a method, a network device, and a computer-readable storage medium for determining a linked network path for routing organization data packets using a service-oriented protocol based on service type and latency requirement.

In an embodiment, a network device (e.g., a first network device) is disclosed. The first network device is configured to access organization packet (OP) routing information and service information relating to an organization associated with a first autonomous system (AS). The OP routing information and the service information are accessed based at least in part on an organization identifier of the organization associated with the first AS. The service information indicates a service type associated with the organization. The first network device may be an organization transit gateway protocol (OTGP) edge router that connects the first AS to other autonomous systems maintained and controlled by the same ISP or different ISP. In particular, the first network device may be an OTGP speaker during a first time period, during which the first network device may exchange routing and reachability information with its neighboring routers and send organization data packets generated by the organization to the destination.

The first autonomous system may be a network that is controlled by an ISP, based on a common routing policy. For example, the organization may run within the first AS using public or private ASN to the corresponding ISP. The ISP connects the organization to the Internet, via the first AS. Subsequently, the ISP may provide web services to the organization, specifically, computing nodes associated with the organization, using the first AS. The manner in which the first network device operates, specifically, to determine a preferred path for routing, is described in detail throughout the present disclosure.

The first network device is configured to receive an organization data packet from the organization. In an example, an organization network may be facilitated by the first AS. The organization data packet may indicate a second network device associated with a second autonomous system. In particular, the second AS may correspond to a destination network for the organization data packet. In an example, the organization data packet may indicate an address relating to the second AS, the second network device, or a computing node within the second AS.

For sake of clarity and for illustrative purposes only, an AS is described to have a single edge network device. Pursuant to the present example, the first AS includes the first network device. Similarly, the second AS includes the second network device, the second network device being the edge network device of the second AS.

Based on the OP routing information and the service type, the first network device is configured to determine a communication link between the first network device and the second network device. The communication link may include a plurality of paths. Further, the first network device is configured to determine a set of connection metric values for the communication link. In this regard, the set of connection metric values may be determined for each of the plurality of paths of the communication link. Thereafter, the first network device is configured to determine a linked network path between the first network device and the second network device, based on the set of connection metric values. The linked network path is one of the plurality of paths. To this end, the first network device is to send the organization data packet to the second network device via the linked network path. In an example, a path having the lowest connection metric value may be selected as the linked network path from the plurality of paths.

The present disclosure provides a service-oriented Internet routing protocol referred to as 'Organization Transit Gateway Protocol' or 'OTGP'. The routing protocol defined in the present disclosure is meant to carry internet traffic or data packets from different organizations, businesses, data centers, or clouds to enable the customers to avail web services, based on service requirements of the organizations or customers. In particular, the OTGP protocol is implemented on the first network device and the second network device. Based on the OTGP, the preferred path or the linked network path is determined for routing the organization data packet. The OTGP relies on determining the linked network path for routing data packets based on the service type of the organization. Based on the determined linked network path, neighbor relationships may be formed. In an example, as per OTGP, an OTGP enabled edge router may send service messages to a peer router to form a neighbor relationship. The service messages are exchanged based on Reach, Attempt, Interconnect, and Network (RAIN) architecture. In particular, different service messages are shared iteratively with the peer router during each of the RAIN stages to form the neighbor relationship with the peer router. Further, routing information and organization data packets may be communicated to the peer router during the Network stage in a secure manner, based on the linked network path.

Various embodiments of the present disclosure offer multiple advantages and technical effects. For instance, it may be noted that as per OTGP, the linked network path, i.e., the preferred path is determined based on the service type relating to the organization. For example, if a service type for an organization indicates audio traffic, in such a case more importance may be given to latency and less to bandwidth during connection metric value calculation. Similarly, if a service type for an organization indicates video traffic, in such a case more importance may be given to bandwidth and less to latency during connection metric value calculation. Moreover, if a service type for an organization indicates multicast, in such case equal importance may be given to bandwidth and latency, however, it may not be considered as high demand during connection metric value calculation.

In accordance with an embodiment of the present disclosure, the organization may have a simple ISP line connected to the first network device, i.e., an edge OTGP network device. The organization may also be connected to data forwarders, i.e., forwarding OTGP network devices. The OTGP network devices form neighbors and are configured to establish the linked network path. The linked network path is determined based on the service type of the organization thereby improving the quality of service for the organization. In particular, the ISP may provide multiple services to its customers, i.e., organizations, based on the organizations' needs. In an example, a service required by the organization may be a secured service (VPN), for example, IPSec-based service configuration. In such a case, the first and the second network devices form neighbors by completing phase 1 of the IPsec tunnel, i.e., forming a linked network path, dynamically. In this regard, for the phase 1 of establishing the IPSec tunnel between the first and the second network device is handled by the OTGP, thereby covering the overheads. Further, different services may be provided to the organization without updating the infrastructure or using the plurality of redundant network elements. Beneficially, the service-oriented OTGP protocol has no overheads of ESP packets. Moreover, the network communication system facilitated by the OTGP is fault-tolerant. In other words, if anything fails, OTGP will switch to other paths automatically without service disruption. In addition, the organization may not need any security appliance or any other equipment. This may reduce costs associated with networking as no expenditure is required on expensive security appliances with its yearly license renewal requirement. Further, the linked network path is determined based on the operational status of network elements and communication links between the network elements. In other words, the linked network path is determined by taking into consideration any malfunction or inconsistency at any network element or communication link and traffic load. Subsequently, the delay in transmission of data packets from source to destination is reduced substantially and decreases instances of downtime. This further ensures seamless connectivity over the Internet and improves the user experience. The OTGP network infrastructure described in the present disclosure may be extended to ordinary service providers and for small/home business entities.

By sharing the routing information over the linked network path, a neighbor relationship is formed between the first network device and the second network device. It is to be noted that the linked network path is established by matching service information required by the organization with the path attributes of the linked network path. The linked network path is compliant with the requirements of the organization. As the linked network path is active, delays in communication due to unavailability or non-reachability of the second network device are substantially reduced. Further, as security, encryption, and policing requirements of the organization data packets are performed by the first network device, i.e., OTGP router, additional networking products may not be required for communication of organization data packets. As a result, the costs incurred for secure networking by the organization may decrease substantially. Moreover, delays due to incoherent operation of different networking products may also be substantially reduced.

Various embodiments of the present disclosure are described hereinafter with reference to FIG. 1 to FIG. 6.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, determining connection metric values for linked network path for routing network traffic using an organization transit gateway protocol (OTGP). The environment 100 generally includes a plurality of autonomous systems (for example, a first autonomous system (AS) 102 and a second autonomous system (AS) 104). The term 'autonomous system' as used throughout the description may refer to a network having a unified routing policy that may be managed by an administrative entity, such as an associated ISP, a large enterprise technology company, a university, or a government agency. In particular, a computing node may connect to the AS to access the Internet and avail of the services offered by the ISP.

The Autonomous System (AS) is defined as a logical portion of a larger IP network. An AS normally includes internetwork within an organization. It is administered by a single management authority. An AS can connect to another AS managed by the same administrative entity. It can also connect to other public or private networks.

The environment 100 operates in the context of a data communication network including multiple network elements. Some of the network elements in a network may be network devices such as routers, switches, gateways, or servers. The network device may include, for example, a processor, memory, interfaces, and a bus. While a certain number of entities is depicted in the environment 100 for purposes of illustration, other environments may include any number or arrangement of nodes. The depiction of the environment 100 as described below herein is only illustrative and should not be construed as limiting in any manner.

In an example, a first organization 106 and a second organization 108 are enrolled under the first AS 102. In particular, the first organization 106 may include a first set of nodes, depicted as nodes 110a, 110b, and 110c, and the second organization 108 may include a second set of nodes, depicted as nodes 112a and 112b. Herein, the nodes 110a-110c and nodes 112a and 112b may be computing entities, such as computing devices or network devices that may be capable of sending data packets, receiving data packets, processing data packets, and/or routing data packets. In another example, the nodes 110a-110c, 112a, and 112b may be computing devices that may be used for accessing the Internet and avail various services, such as email, video conference, video stream, gaming, and so forth, by users within organizations 106 and 108, respectively. For example, each of the nodes 110a-110c, 112a, and 112b may have a corresponding unique IP address for its identification on the Internet. Each of the nodes 110a-110c, 112a, and 112b may also have a corresponding unique device identifier (for example, MAC address for its identification).

In accordance with embodiments of the present disclosure, the autonomous systems (i.e., the first AS 102 and the second AS 104) further include a first network device 114 and a second network device 116 (interchangeably used as OTGP routers 114 and 116), respectively. The network device is used interchangeably with the OTGP router in the description; however, it should not be interpreted as a limitation. Other examples of the network devices may include, but are not limited to, gateways, switches, bridges, hubs, and so forth.

The first network device 114 and the second network device 116 may be implemented using any type of a networking device, such as a special-purpose computer, router, switch, or general-purpose computer, and may use hardware logic such as in an application-specific integrated circuit (ASIC), field-programmable gate array (FPGA), system-on-a-chip (SoC) or other combinations of hardware, firmware and/or software. In an embodiment, the first network device 114 is configured to route an organization data packet received from a computing node to its corresponding destination. In an example, the destination of the organization data packet may be within the second AS 104. Subsequently, the first network device 114 may route the organization data packet to the second network device 116 connected through a communication network 118.

In one example, the first network device 114 and the second network device 116 may each administer organization transit gateway protocol (OTGP). Each of the network devices 114 and 116 may be injected with OP routing information and may receive route update information from its neighbors. In an example, route update information may be received through a flooding process. Each of the network devices 114 and 116 may maintain the routing information, for example, in form of one or more tables, for storing its routing information and updates obtained from its neighbors. The operations of OTGP routers 114 and 116 are described in detail with respect to the following figures.

The first AS 102 and the second AS 104 may be interconnected by corresponding the first and second network devices 114 and 116, via the communication network 118. For example, the communication network 118 may be embodied as a wired network, a wireless network, or a combination of wired and wireless networks. Some non-limiting examples of the wired network include Ethernet, Local Area Network (LAN), Optical Fiber network or combinations, thereof. Some non-limiting examples of the wireless network include a cellular network, a wireless LAN (WLAN) network, a Bluetooth or a ZigBee network, and combinations thereof. An example of a combination of a wired network and a wireless network is the Internet. Various entities in the environment 100, such as the OTGP routers 114 and 116, may connect to the communication network 118 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, and the like.

In an example, routing decisions within each of the first AS 102, and the second AS 104 may rely on an interior gateway protocol (IGP) (such as Open Shortest Path First (OSPF) or Intermediate System-to-Intermediate System (ISIS)). Further, for routing data packets outside of an AS, for example, from the first AS 102 to the second AS 104, a neighbor relationship may have to be established among the autonomous systems 102 and 104, using an exterior gateway protocol, such as organization transit gateway protocol (OTGP). For example, the first network device 114 in the first AS 102 may send a plurality of service messages to the second network device 116 in the second AS 104 to establish the neighbor relationship.

In an example, communication between the first network device 114 and the second network device 116 may be affected by exchanging discrete organization data packets or messages in accordance with protocols, such as Transmission Control Protocol/Internet Protocol (TCP/IP). It may be noted that the representation of only two autonomous systems 102 and 104 is only illustrative and any number of autonomous systems may be included in the environment 100. Moreover, any number of OTGP edge routers may be present in a single autonomous system and an OTGP edge router of the first AS 102 may be connected to any number of OTGP edge routers from other autonomous systems. It will be understood by those skilled in the art that the organization transit gateway protocol (OTGP) as discussed herein is described to be used in conjunction with TCP/IP protocol for communication. The OTGP provides unique features for organizations to route all types of traffic mainly IPv4, IPv6, or Ethernet frames. The OTGP enables customers/organizations to implement some sort of policy on their vendor ISP infrastructure.

However, this should not be construed as a limitation and in other examples of the present disclosure, and the OTGP may be implemented in conjunction with File Transfer Protocol (FTP), User Datagram Protocol (UDP), Hypertext Transfer Protocol (HTTP), Internet Message Access Protocol (IMAP), Simple Mail Transfer Protocol (SMTP), Interior gateway protocol (IGP), Border gateway protocol (BGP), and so forth, without departing from the scope of the disclosure.

In operation, a session within the environment 100 may involve the first network device 114 to determine a linked network path for reaching a destination address for an organization data packet. The first network device 114 may access organization packet (OP) routing information and service information relating to the first organization 106 associated with the first autonomous system 102. Moreover, the first network device 114 may receive an organization data packet from the first organization 106. The organization data packet may indicate the second network device 116 associated with the second autonomous system.

In an example, the organization data packet may indicate the second network device as a destination. For example, the organization data packet may include an IP address of the second network device 116 or a computing node within the second AS 104 as the destination address. Moreover, the first network device 114 and the second network device 116 may be connected to each other directly or remotely. The OTGP enabled first network device 114 may operate on different layers, such as layer 2, layer 3, layer 4, and layer 5 of the OSI model to determine the linked network path for routing an organization data packet. In particular, the first network device 114 may determine the linked network path on the physical layer, i.e., wired path, as well as on the network layer.

In one example, a direct connection may exist between the first network device 114 and the second network device 116. In such a case, a communication link between the first network device 114 and the second network device 116 may be physical (or wired), or wireless. In particular, multiple redundant paths may exist between the first network device 114 and the second network device 116. In such a case, the OTGP enabled first network device 114 is configured to determine a single path from the multiple redundant paths as a preferred path. Such a preferred path may be activated to form a linked network path between the first network device 114 and the second network device 116.

In another example, a remote connection may exist between the first network device 114 and the second network device 116. In such a case, the first network device 114 and the second network device 116 may not be directly connected. In other words, a data packet sent by the first network device 114 may have to hop through one or more autonomous system networks to reach the second network device 116. Moreover, one or more autonomous system networks may lie in between the first network device 114 and the second network device 116. To this end, multiple paths may exist between the first network device 114 and the second network device 116 that may be facilitated by the one or more autonomous system networks. In such a case, the OTGP enabled first network device 114 is configured to determine a single path from the multiple paths as a preferred path. Such a preferred path may be activated to form a linked network path between the first network device 114 and the second network device 116.

In certain cases, the first network device 114 may operate on different levels of the OSI model simultaneously to determine the preferred path. Further, the preferred path may be set up as the linked network path and may be used for data transfer in between the first network device 114 and the second network device 116.

It may be noted that the communication network may include a plurality of OTGP enabled network devices, such as the first network device 114 and the second network device 116. Subsequently, each of the plurality of OTGP enabled network devices or OTGP routers may determine linked network paths in a similar manner on different levels of operation and based on service type associated with a corresponding organization. The manner in which the linked network path is determined is further explained in detail with the appended figures.

Figure 2:
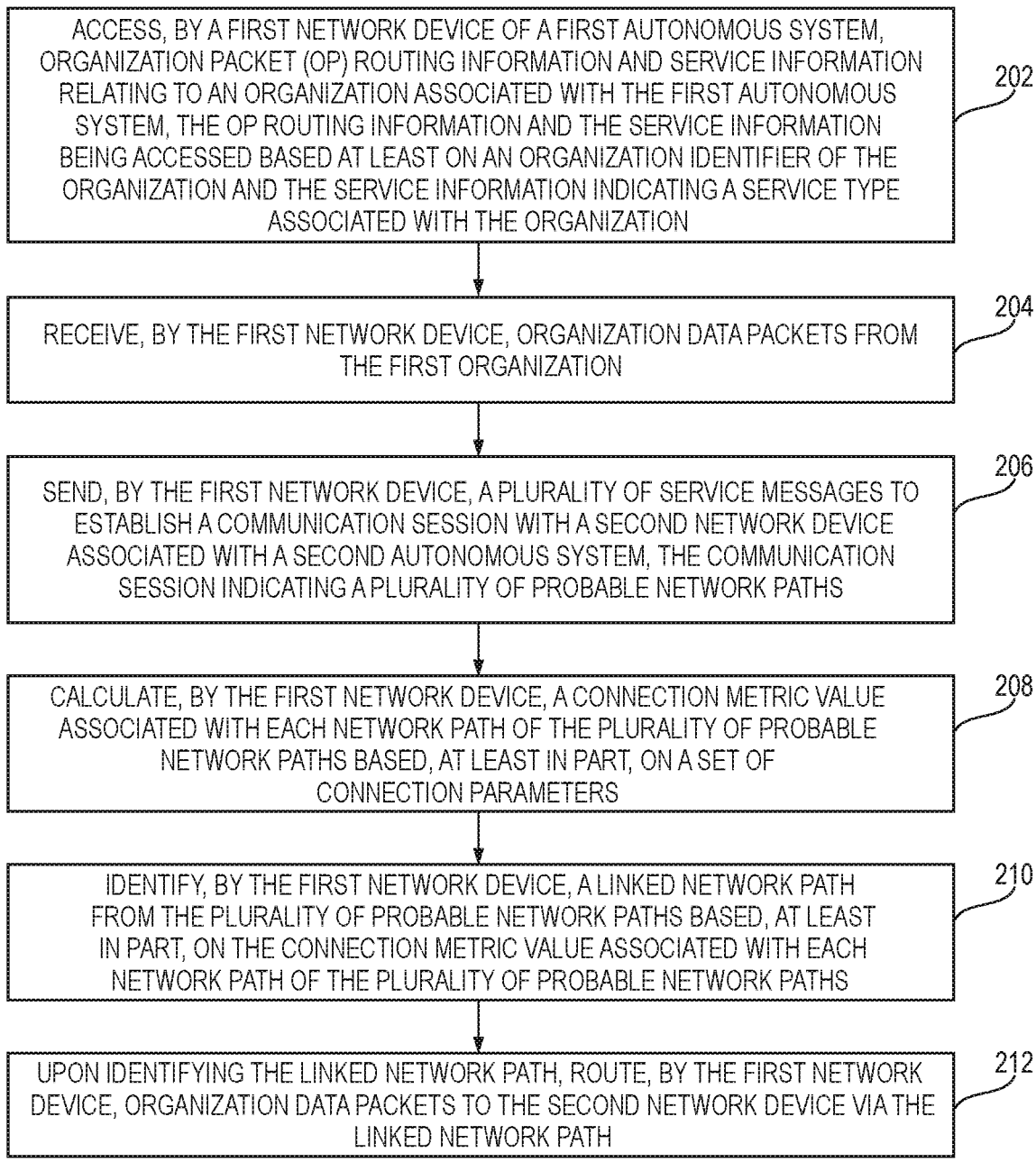
FIG. 2 is a flow diagram of a computer-implemented method for determining a linked network path for routing an organization data packet, in accordance with an embodiment of the present disclosure.

FIG. 2 is a flow diagram of a computer-implemented method 200 for determining a linked network path for routing network traffic, in accordance with an embodiment of the present disclosure. The method 200 depicted in the flow diagram may be executed by, for example, a processor of the first network device 114. Operations of the flow diagram of the method 200, and combinations of operation in the flow diagram of the method 200, may be implemented by, for example, hardware, firmware, a processor, circuitry, and/or a different device associated with the execution of software that includes one or more computer program instructions. It is noted that the operations of the method 200 can be described and/or practiced by using a system other than these server systems. The method 200 starts at operation 202.

At the operation 202, the method 200 includes accessing, by the first network device 114, organization packet (OP) routing information and service information relating to the first organization 106 associated with the first autonomous system 102. The OP routing information may include information pertaining to neighbors of the first network device 114. The neighbors may be connected with the first network device 114 by the same physical link or maybe reachable via hops. The OP routing information may also include information relating to various nodes or routers, services, and connections within the communication network that may be identified by the first network device 114. In an example, OP routing information may include information, such as MAC address of neighbors, properties of neighbors, IP address of neighbors, communication port of the neighbors, and so forth. For example, the OP routing information may include an Organization Packet (OP) route table, OP service table, and OP link table. Further, the service information relating to the organization may indicate service requirements or service plans selected by a customer, such as the first organization 106. The service information may indicate, for example, properties or attributes of a communication link, based on which organization data packets generated by the first organization 106 may be communicated to its corresponding destination.

The first network device 114 may access the OP routing information and the service information based at least on an organization identifier of the first organization 106. In an example, the first network device 114 may be injected with OP routing information during set-up that may be periodically updated based on changes in the communication network. Such OP routing information may be updated based on information gathered from neighbors that are advertised to the first network device 114. The first network device 114 may maintain the OP routing information within a corresponding memory. The first network device 114 may collect the service information based on an organization identifier. The service information may indicate a service type selected by the first organization 106. The organization identifier may be a unique identifier allocated to the first organization 106 when the first organization 106 may register with an ISP associated with the first AS 102. Subsequently, a network administrator of the first organization 106 may define the service information, for example, at the time of registering, or later. For example, such service information may be stored in conjunction with the organization identifier, within a database associated with the ISP. To this end, on identifying nodes, such as nodes 110a-110c, associated with the first organization 106 within the first AS 102, the first network device 114 may retrieve its organization identifier and further access the OP routing information and the service information corresponding to the first organization 106. It may be noted that the organization identifier may be the same for different nodes 110a-110c within the first organization 106.

At operation 204, the method 200 includes receiving, by the first network device 114, organization data packets from the first organization 106. The organization data packets may include information of the second network device 116 associated with the second autonomous system 104. For example, the organization data packets may have an associated OP header. The OP header may indicate, for example, a destination address. In an example, the OP header of the organization data packet may have an address associated with the second network device 116 within a destination address field. The first network device 114 and the second network device 116 are configured with organization transit gateway protocol (OTGP).

For example, prior to receiving the organization data packet, IGP may be set up within the first AS 102. In this regard, the nodes 110a-110c, 112a, and 112b are configured to send organization data packets to the first network device 114 for routing. In certain cases, other network devices, such as service network devices and forwarding network devices may be administered within the first AS. In such a case, the nodes 110a-110c, 112a, and 112b may forward the organization data packets to the nearest network device serviceable to the nodes 110a-110c, 112a, and 112b and the network device may forward the organization data packets to the edge OTGP router or the first network device 114 directly or via another network device.

At operation 206, the method 200 includes sending, by the first network device 114, a plurality of service messages to establish a communication session with the second network device 116 associated with the second autonomous system 104. The communication session may indicate a plurality of probable network paths. For example, the plurality of service messages may be sent over one or more of the plurality of probable network paths to the second network device 116. Each probable network path may include one or more link interfaces and nodes and inter AS path or route. The inter AS path may involve the path from a source autonomous system to a destination autonomous system possibly via intermediate autonomous systems. The network topology includes a number of different routes from the source autonomous system to the destination autonomous system. The first network device 114 may send the plurality of service messages to the second network device 116 to establish a neighbor relationship link. The plurality of service messages may include information of service type, thereby establishing the neighbor relationship link based on the information of the service type.

At operation 208, the method 200 includes calculating, by the first network device 114, a connection metric value associated with each network path of the plurality of probable network paths based, at least in part, on a set of connection parameters. The network paths learned via OTGP have an associated set of connection parameters that are used to determine the preferred network path or a linked network path to a destination when multiple paths exist. In an example, the set of connection parameters may include, but are not limited to, (a) a number of hops (i.e., routers) between the first network device 114 and the second network device 116, (b) speed of routers (i.e., latency) to cross to reach the second network device 116, (c) a value of service type required by the first organization 106, (d) value of a device constant associated with the first network device 114 and/or the second network device 116 and (e) link cost factors such as the distance of a router, called round-trip time, network throughput of a link (e.g., bandwidth, and link availability and reliability), etc. The set of connection parameters may further include standard path attributes.

At operation 210, the method 200 includes identifying, by the first network device 114, a linked network path from the plurality of probable network paths based, at least in part, on the connection metric value associated with each network path of the plurality of probable network paths. The linked network path is associated with the lowest connection metric value among connection metric values of the plurality of probable network paths.

For example, the plurality of probable network paths may be physical link interfaces including a plurality of wired redundant paths to reach the second network device 116 directly. In another example, the plurality of probable network paths may be wireless and may include a plurality of wireless redundant paths or a plurality of paths facilitated by multiple routers to reach the second network device 116 remotely. In an example, the first network device 114 determines a preferred path based on the connection metric values associated with the plurality of probable network paths. For example, a path having the lowest connection value may win and may be selected as the preferred path. Such a preferred path may then be activated. The activated preferred path may form the linked network path between the first network device 114 and the second network device 116.

At operation 212, the method 200 includes routing organization data packets to the second network device 116 via the linked network path. In this regard, the first network device 114 may send a cryptographic key data structure, for example, a hash value, to form a phase 1 IPSec tunnel. The second network device 116 may complete the IPSec tunnel and send back a response including a security key to the first network device 114.

In an example, an encapsulating security payload (ESP) header may further be added on top of the OP header to the organization data packets. For example, the first network device 114 may create a new OP header for the organization data packet and use the OP header as the outermost header of the organization data packet, followed by the ESP header and then the original data packet. For example, the ESP trailer and the authentication data are appended to the payload. On receiving the response, the first network device 114 may encrypt the organization data. For example, the first network device 114 may encrypt the organization data packets using the organization identifier and the security key. The first network device 114 may then send the encrypted organization data packets over the linked network path or the active preferred network path.

In this manner, the organization data packets may be transmitted to the destination address. As the linked network path is determined based on the service type, service requirements of the organization are ensured while routing. Moreover, determining the linked network path based on the different levels of operation, malfunctioning or faults at the physical level may be identified and delays due to such faults may be avoided. This may reduce delay in communication and enhance the speed of accessing data or information and communication over the Internet while ensuring the security of organization data packets. It may be noted that the second network device 116 may correspond to the destination address. In an example, the second network device 116 may be directly connected to the first network device 114. In such a case, the first network device 114 may route the organization data packet directly to the destination, i.e., the second network device 116. In another example, the second network device 116 may be remotely connected to the first network device 114. In such a case, the first network device 114 may route the organization data packet to a neighbor network device or neighbor OTGP router. The neighbor OTGP router may be a part of the determined preferred path or linked network path and may serve as a point of hop for the organization data packets.

Figure 3:
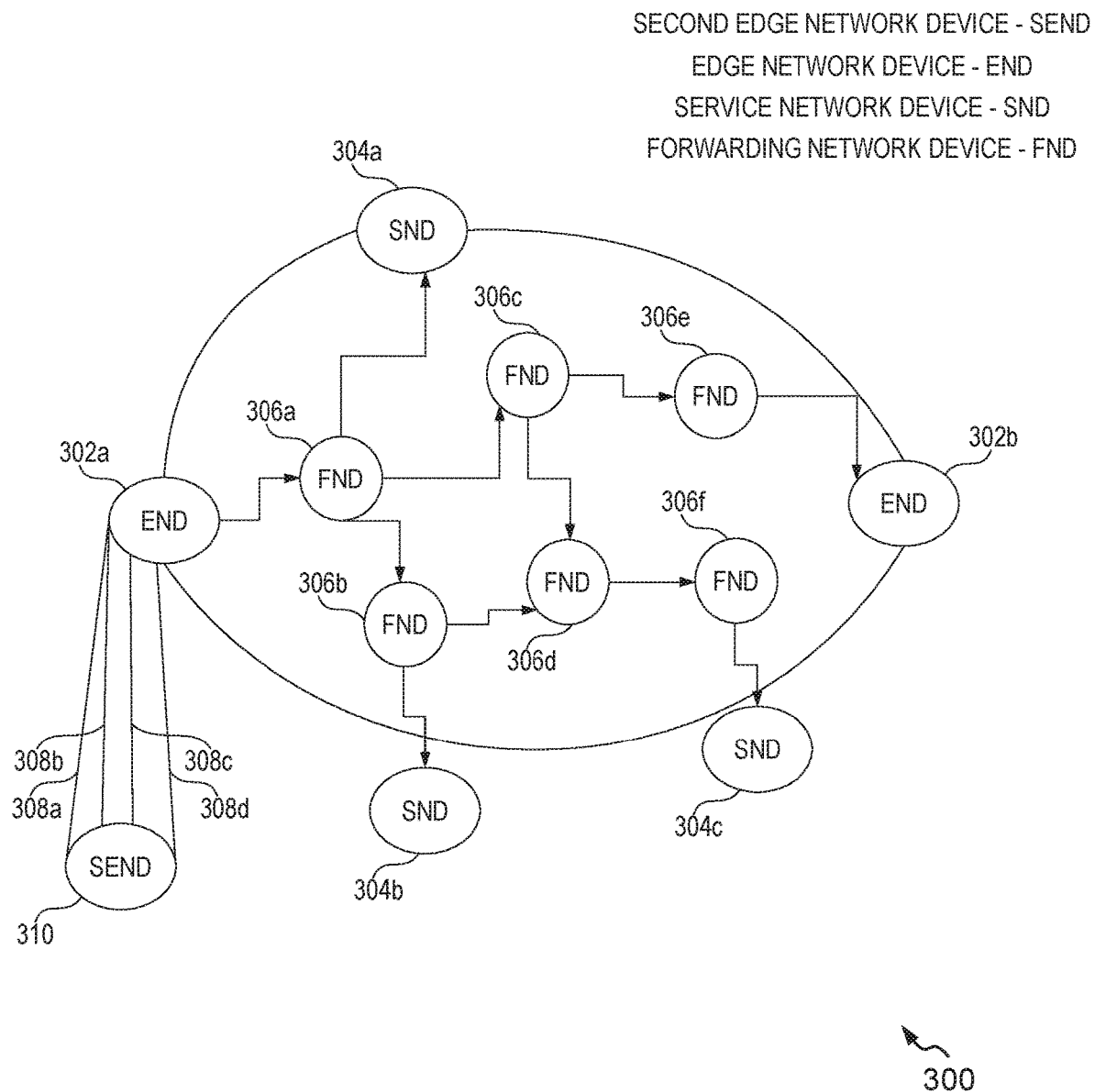
FIG. 3 illustrates an exemplary representation of an autonomous system environment related to at least some example embodiments of the present disclosure.

FIG. 3 illustrates an exemplary representation of an autonomous system environment 300 related to at least some example embodiments of the present disclosure. For sake of clarity, in an example, the autonomous system environment 300 may relate to the first AS 102. The AS environment 300, i.e., the first AS 102, may include a plurality of network devices, depicted as network devices 302a, 302b, 304a, 304b, 304c, 306a, 306b, 306c, 306d, 306e, and 306f. The plurality of network devices includes edge network devices 302a and 302b, i.e., edge OTGP routers 302a and 302b. The plurality of network devices further includes service network devices 304a-304c, i.e., service OTGP routers 304a-304c, and forwarding network devices 306a-306f, i.e., forwarding OTGP routers 306a-306f. It may be noted that the AS environment 300 may also include computing nodes (not shown in FIG. 3), such as the first set of nodes 110a, 110b, and 110c associated with the first organization 106, and the second set of nodes 112a and 112b associated with the second organization 108.

The edge OTGP routers 302a and 302b may correspond to the first network device 114. In other words, the operations and functions associated with the first network device 114 (as depicted in FIG. 1) may be performed by either one or both of the edge OTGP routers 302a and 302b. The edge OTGP routers 302a and 302b may be configured to establish a connection between organizations and/or autonomous systems for routing of data packets to, from, and/or through the first AS 102.

In operation, the edge OTGP routers 302a and 302b may determine a linked network path based on service type and an IP type associated with a corresponding organization, for example, a service type of the first organization 106 and IP type for routing of data packets from the first organization 106. Moreover, the edge OTGP routers 302a and 302b may be configured to maintain and update OP routing information associated with a communication network and relating to the first AS 102 or the AS environment 200.

In an example, the OP routing information may only be updated by the edge OTGP routers 302a and 302b. Upon updating, the edge OTGP routers 302a and 302b are configured to update or modify a revision identifier associated with the OP routing information. A value of the revision identifier of the OP routing information indicates a version of the OP routing information.

Moreover, the edge OTGP routers 302a and 302b are also operable to update vendor hops (VHOP) values of data packets forwarded by the edge OTGP routers 202a and 202b, based on vendor or ISP associated with at least one of the previous hop and next hop. It may be noted, a VHOP value may indicate the number of router hops undergone by a data packet to reach a corresponding destination. Therefore, the VHOP value of a data packet is increased only when it passes from one Internet service provider (ISP), or vendor associated with ISP to another. For example, if there are two Internet service providers between a source organization and a destination organization, a VHOP value of a data packet received at the destination will be 2, irrespective of the hop count of the data packet.

Further, the edge OTGP routers 302a and 302b may perform route advertisements to exchange updates and changes in the network with their peers or neighbors. For example, the edge OTGP routers 302a and 302b may maintain OP routing information as route tables. The route tables may include information such as routes, router names, interface names, IP addresses, nodes, and network addresses, based on configured protocol. Using the OTGP routing protocol, the edge OTGP routers 302a and 302b are operable to establish an OTGP session to exchange a route advertisement or a route update.

It may be noted that an edge OTGP router 302a may have multiple connections 308a-308d to each adjacent edge router (for example, a second edge OTGP router 310 of a second AS 104). The edge OTGP router 302a may calculate the connection metric value for each of the multiple connections 308a-308d to determine the best path or a preferred path. For example, a connection metric value from the multiple connections 308a-308d having the lowest connection metric value may be selected as the best path or preferred path. The selected best path is activated and converted to a link state or a linked network path. The edge OTGP router 302a and the second edge OTGP router 310 may then exchange network or security messages over the linked network path.

In an example, the connection metric value for a connection is calculated based on a formula:

$$\text{Connection metric value} = \text{number of hops} \times \text{latency} \times \text{service type}/K_s \times \text{bandwitch} \times 100 \qquad \text{Eqn. (1)}$$

Herein, the number of hops may indicate a number of routers that may have to be hopped before reaching the second network device 116, via the connection. A value of latency may indicate delay per hop for the organization data packets. Such delay may be caused due to mechanisms that handle, for example, listening before talking (LBT), re-transmission, and handshaking. The value of latency may indicate a total delay across the number of hops to reach the second network device 116. A value of bandwidth may indicate the speed at which organization data packets may be transmitted over the first path or portions constituting the first path. The bandwidth may be measured in terms of a number of bits that are transferred over a channel per second. Further, the $K_s$ is a device constant, and a value of the $K_s$ may be based on a hardware model of the first network device 114 and/or the second network device 116. Moreover, a value of service type may be pre-determined based on the service information. The value of service type may also depend on the hardware model of the first network device 114.

For example, the edge OTGP router 302a may send a plurality of service messages to the second edge OTGP router 310. The plurality of service messages may comply with Reach, Attempt, Interconnect, and Network (RAIN) architecture. In the above equation, a hop may be a portion of a path between source and destination. Moreover, each time a data packet passes through a device occurs, a hop is counted. Subsequently, the number of hops may indicate the total number of devices to be hopped. In the case of a direct connection between the source and the destination, as illustrated in the present FIG. 3, the number of hops may be 1 for each of the multiple connections 308a-308b.

In operation, the edge OTGP router 302 may establish a neighbor communication link with the second edge OTGP router 310. In this regard, the edge OTGP router 302 may send a first service message on a pre-configured communication port to perform a 'REACH' operation (i.e., to discover the second edge OTGP router 310). The edge OTGP router 302a may determine the number of hops for the connection and latency at the connection during a REACH operation. The edge OTGP router 302 may then send a second service message to perform an 'ATTEMPT' operation (i.e., to negotiate a set of routing parameters with the second edge OTGP router 310). The edge OTGP router 302 may then send a third service message to perform an 'INTERCONNECT' operation (i.e., to ensure that neighbor relationship link is formed with the second edge OTGP router 310 and has full reachability). The edge OTGP router 302 may also send a fourth service to perform a 'NETWORK' operation (i.e., to exchange the OP routing information, route advertisement, or send the organization data packet to the second edge OTGP router 310). The edge OTGP router 302a may determine the linked network path before reaching the Network operation in the RAIN architecture.

The plurality of service messages may include a packet header that includes a set of fields. The set of fields is as follows:
(a) Operation field: It includes data pertaining to actions associated with the service message, i.e., the action to be performed based on the transmission of the service message to the second edge OTGP router 310.
(b) Error field: It represents an error message.
(c) Type field: The 'type field' indicates the operation type of an operation of the service message. The operation may be one of: 'REACH', 'ATTEMPT', 'INTERCONNECT', and 'NETWORK'.
(d) Length field: It represents the total length of the service message and the packet header.
(e) Version field: It represents a version identifier of the running OTGP routing protocol.
(f) Time To Live (TTL) field: It indicates the number of routers or network devices that the service message has passed through.

In one embodiment, the service OTGP routers 304a-304c may partially perform operations associated with the edge OTGP routers 302a and 302b. In particular, the service OTGP routers 304a-304c may not participate in route advertisement. The service OTGP routers 304a-3204c may be used on the customer or hosting side of the Internet service provider, i.e., the organization side. For example, the first organization 106 (i.e., a customer of an internet service provider associated with the first AS 102) may be a video communications company. The first organization 106 may use the service OTGP routers 304a-304c as edge routers for the first organization 106 and declare or provide service information associated with the first organization 106 to the service OTGP routers 304a-304c. Further, the edge OTGP routers 302a and 302b may access such service information from the service OTGP routers 304a-304c. The edge OTGP routers 302a and 302b may distribute or advertise route information based on the accessed service information to other edge routers and determine the preferred path or linked network path for routing network traffic from the first organization 106 to the corresponding destination.

In one embodiment, the forwarding OTGP routers 306a-306f may be configured to forward network data traffic across various network elements within the AS environment 200. In particular, the forwarding OTGP routers 306a-306f may not be involved in the routing of data packets or route advertisement. The forwarding OTGP routers 306a-306f may use internal gateway protocols, for example, Open Shortest Path First (OSPF), Routing Information Protocol (RIP), Intermediate System to Intermediate System (IS-IS), and Enhanced Interior Gateway Routing Protocol (EIGRP) to forward network data traffic within the AS environment 300. In an example, the forwarding OTGP routers 306a-306f may forward network data traffic from one edge OTGP router, such as the edge OTGP router 302a, to another edge OTGP router, such as the edge OTGP router 302b. In another example, the forwarding OTGP routers 306a-306f may forward network data traffic from one edge OTGP router, such as the edge OTGP router 302a, to a service OTGP router, such as the service OTGP router 304b. In yet example, the forwarding OTGP routers 306a-306f may forward organization data packets from a computing node of an organization to the edge OTGP router 302a. The examples of forwarding are only illustrative and should not be construed as limiting. The forwarding OTGP routers 306a-306f may also provide security if any of the internal routers is compromised.

The AS environment 300 described in the present example is only illustrative and should not be construed as limiting in any way. In other examples of the present disclosure, any number and combination of edge network devices, service network devices, and forwarding network devices may be present within the AS environment 300. Further, in certain cases, the service network devices and/or the forwarding network devices may not be present in an AS environment.

Figure 4:
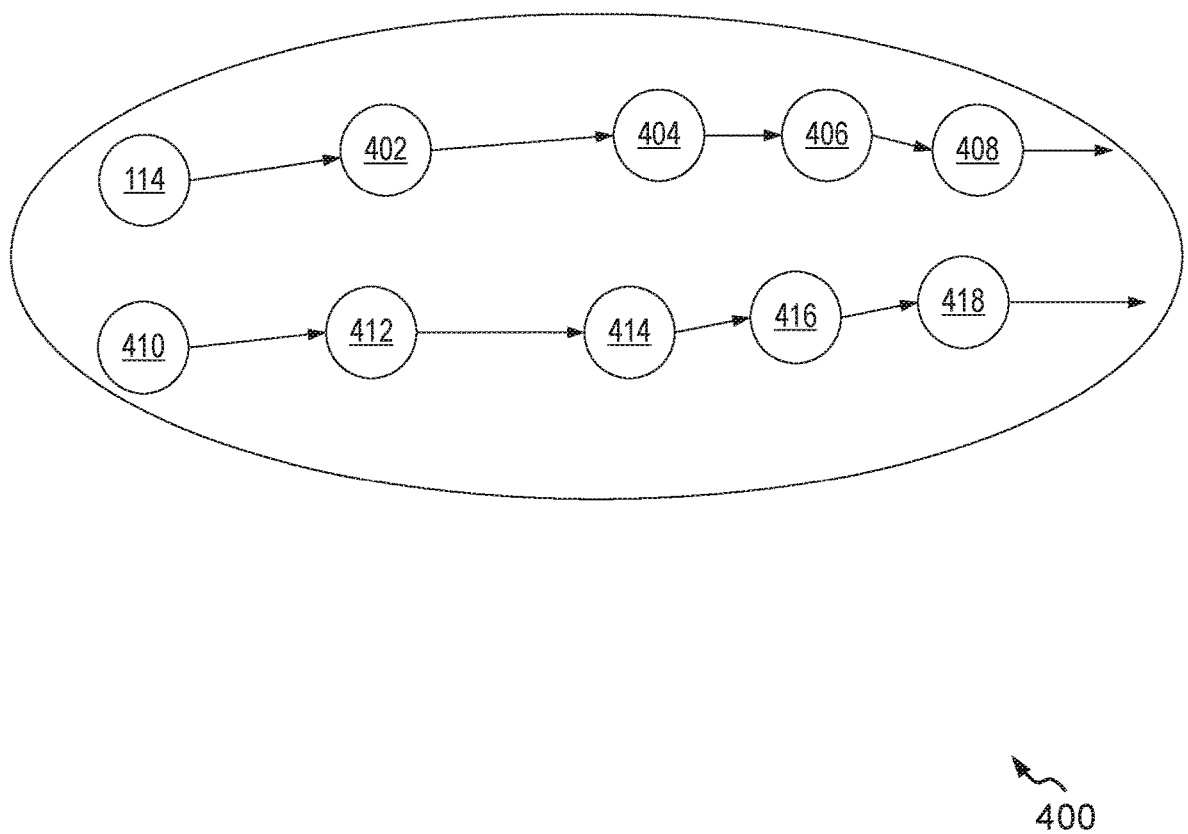
FIG. 4 illustrates an example environment of an internet service provider (ISP) where a linked network path is established for routing an organization data packet, in accordance with an embodiment of the present disclosure.

FIG. 4 illustrates an example environment 400 of an internet service provider (ISP) where a linked network path for routing an organization data packet is determined, in accordance with an embodiment of the present disclosure. For example, the ISP may be a vendor providing web services. The ISP may administer the operation of multiple autonomous systems. In particular, the ISP may administer the operation of multiple network devices, depicted as network devices 114, 402, 404, 406, 408, 410, 412, 414, 416, and 418, corresponding to the autonomous systems. In an example, an autonomous system may be operating in accordance with an organization. For ease of explanation, the autonomous system may be the first AS 102 and the organization may be the first organization 106 within the first AS 102. The first AS 102 may include at least one edge network device, such as the first network device 114. Further, the first AS 102 may also service network devices and/or forwarding network devices.

Pursuant to the present example, the first organization 106 may provide a video streaming service. In such a case, the first AS 102 includes the edge network device 114. The edge network device 114 may have a bandwidth of 100 Mb for facilitating video streaming services. As may be understood, the edge network device 114 may fail to seamlessly facilitate streaming of 4 k or 8 k video as the connection link with the edge network device 114 having 100 Mb capacity is not suitable. Subsequently, higher bandwidth is required for streaming the 4 k and 8 k video.

In certain cases, the ISP associated with the first AS 102 may increase its bandwidth on all edge network devices. It may be understood that while the first AS 102 is depicted to have only one edge network device in the present example, however, the first AS 102 may include a plurality of edge network devices. Subsequently, updating the edge network devices within the first AS 102 may be expensive and affect all other network devices within the first AS 102 or outside the first AS 102 that may be connected to the edge network devices.

To overcome the aforesaid shortcoming, OTGP may be deployed on the edge network devices within the communication network, such as on the network devices 114 and 402-418. The OTGP enabled edge network devices, such as the first network device 114 may be configured with a service type associated with the corresponding organization. For example, the first network device 114 may be configured with the service type for the first organization 106. Subsequently, to route organization data packets, i.e., video data packets, the first network device 114 may determine a preferred path from a source to a destination based on the service type. It may be noted that the source is the first network device 114 and the destination may be a client device that may be connected remotely to the first network device 114. The client device may be serviced by the same ISP or different ISP. In particular, the client device may have an associated edge OTGP network device to deliver the organization data packets addressed to the client device to the client device.

Pursuant to the present example, the first network device 114 may have a bandwidth of 100 Mb and may fail to reliably stream 4K or 8K video data packets. In such a case, the ISP associated with the first AS 102 that may administer the network devices 114 and 402-418 may group network devices based on service type associated with the network devices 114 and 402-418. In such a case, a group of network devices, for example, a group including the network devices 114, 402, 404, 406, and 408, that are configured to provide the same type of service, say, video content streaming may be updated. In this manner, only small infrastructure changes may be required at ISP or vendor's end.

Based on the update, service types for the network devices 114, 402, 404, 406, and 408 may also be updated. Thereafter, the first network device 114 may determine the preferred path for routing the organization data packet including the video data, based on service type associated with the network devices 402-418.

In this manner, while determining the preferred network path for routing the organization data packet including video, the first network device 114 may route the organization video traffic through network devices that may facilitate the service type of video, i.e., the group including the network devices 114, 402, 404, 406 and 408.

Further, the ISP may support different services based on different groups by identifying groups of network devices that are capable of facilitating the routing of such service-type data packets. In addition, other ISPs may support different services from the ISP supporting video service type.

Figure 5A:
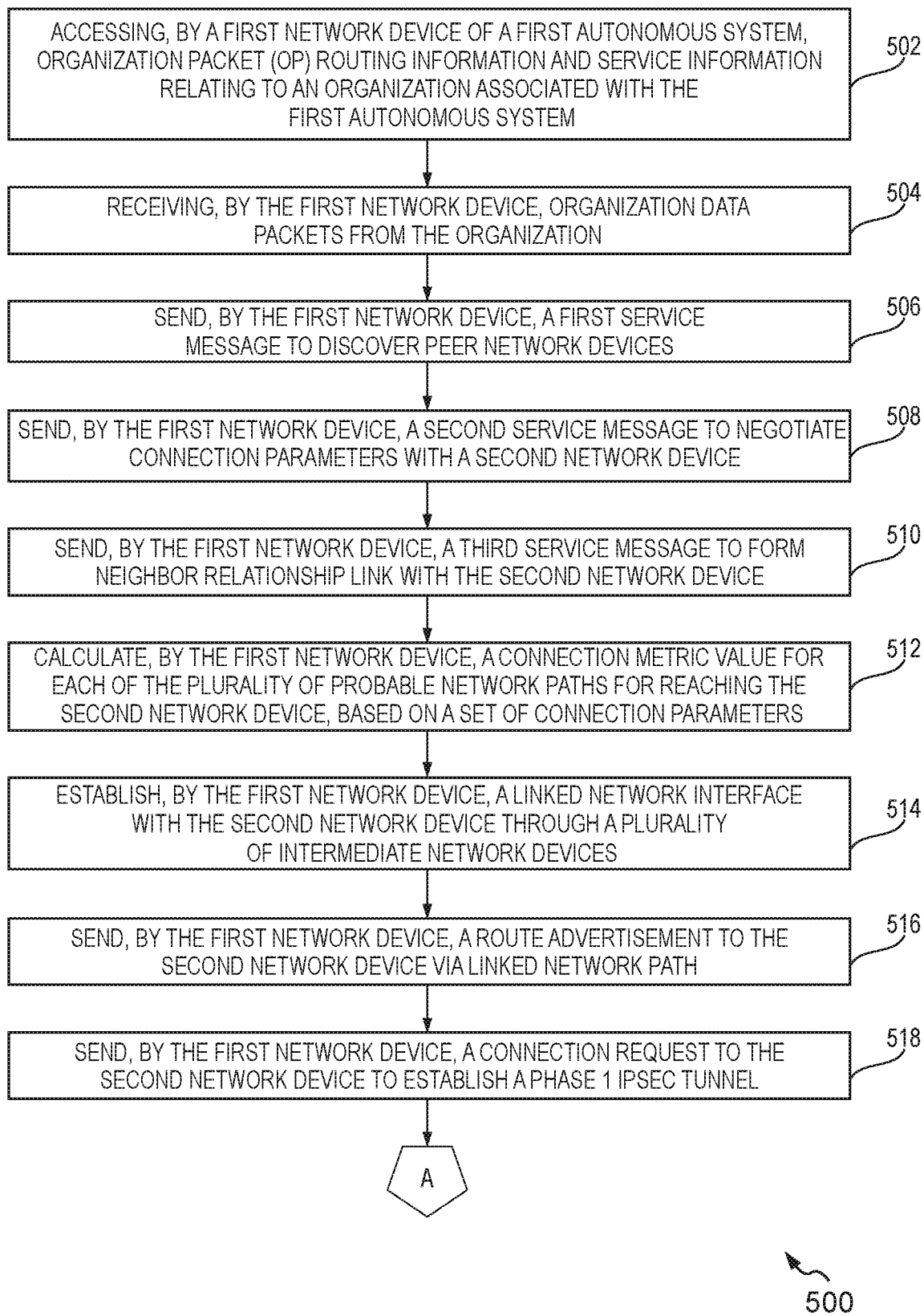
FIGS. 5A and 5B, collectively, represent a process flow of exchanging organization data packet between two network devices according to organization transit gateway protocol, in accordance with an embodiment of the present disclosure.
Figure 5B:
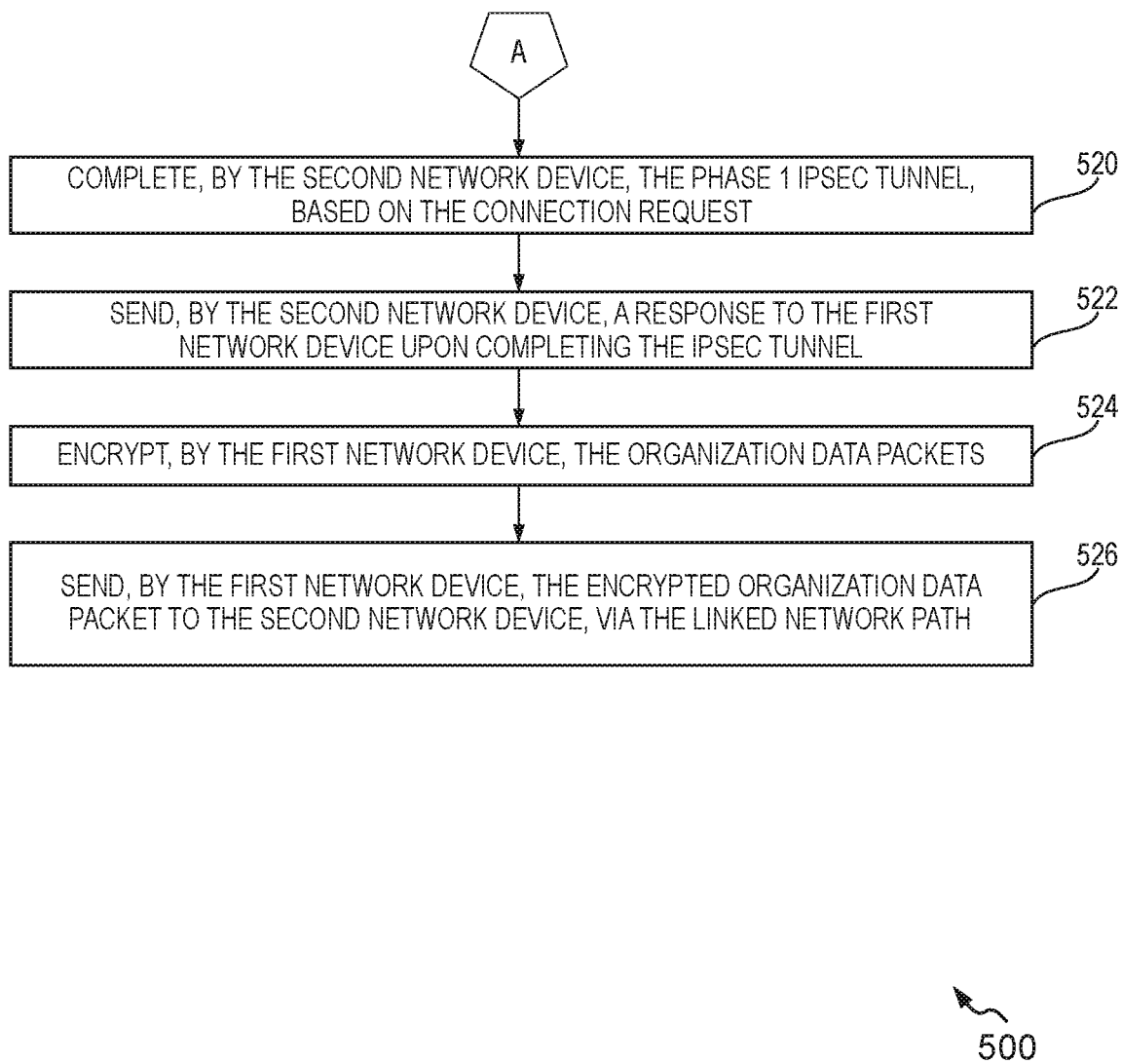

FIGS. 5A and 5B, collectively, represent a process flow 500 of exchanging organization data packets between two network devices according to organization transit gateway protocol (OTGP), in accordance with an embodiment of the present disclosure.

At 502, organization packet (OP) routing information, a cryptographic key data structure, and service information relating to an organization associated with a first autonomous system (AS) 102 is accessed by a first network device 114. In this regard, the first network device 114 may retrieve the OP routing table that may include a number of route tables including, for example, information pertaining to peer network devices having a physical or wireless link with the first network device 114. Moreover, the OP routing information and the service information may be retrieved based on an organization identifier of the organization within the first AS 102.

In an example, the organization identifier for the organization may be allocated to the organization at a time of registry. The organization may register with an Internet service provider (ISP) to avail services offered by the ISP, such as web services, email services, video streaming services, and the like. To this end, the organization may also provide service information to the ISP. The service information may include a service type and IP type based on the requirements of the service.

In an example, the IP type may indicate an IP preference of the organization for carrying out the transmission of the organization data packet. Different IP types may include, but are not limited to, IPv4, IPv6, IPSec, Multicast, Audio, Video codec, Conferencing, and layer 2 or Ethernet frames. The IP type may also be static, dynamic, public, or private.

The service type may indicate pre-defined or user-defined requirements of data transmission from an organization. The service type may carry data, such as a numeric value, indicating a service offered by the ISP and selected by the organization. For example, the service type may define what kind of service is required by the organization, based on, for example, delay, throughput, bandwidth, quality of service, and reliability. Different types of services may be offered by the ISP associated with the first AS 102 of the first organization 106. A network administrator of the organization may pre-define the requirements by providing service information or selecting a type of service for data transmission. Based on the service information, the service type value may be determined. The service type value may be an arbitrary decimal number associated with the service. The value of service type may depend on the hardware model of the first network device 114, for example, a service type may have a value of '70' for video streaming service for a network device operating on 6 core Linux.

Examples of the services may include Multicasting, Internet service, VPN (L2 or L3), Remote VPN, Data forwarding (L2 or L3), Point-to-Point, Private line or MPLS, Video streaming (HD, 4K, 8K, and so forth), audio streaming, and data transfer. For example, the data transfer service type may utilize jumbo frames with high payload capacity for data transfer. Moreover, the value of service type may change based on the hardware model of the first network device 114 and the service information. Since each service has different requirements based on resources, therefore, the value of service type may be predefined to ensure that the device would not fail with a certain load for any service.

It may be noted that the above-described services are only illustrative, and the ISP may offer a plurality of different services based on different technology offerings by the ISP, cost, and requirements of the organization. The ISP may then assign an organization identifier to the organization and store service information (or corresponding value for service type) relating to the organization in conjunction with the organization id. In certain cases, the organization may build a custom service based on their requirements.

The ISP or a central database associated with the first AS 102 may assign a unique organization identifier to the first organization 106, for example, based on autonomous system number (ASN) associated with the first autonomous system 102. Further, the ISP may also associate a vendor identifier with the organization identifier. The vendor identifier may be a unique identifier associated with the ISP or vendor of network hardware products used by the organization and/or the ISP for connecting organization nodes with the first AS 102. By associating the vendor identifier with the organization identifier, the value of service type may be determined.

For example, an administrator associated with the first organization 106 may select a service type for the first organization 106. The administrator may further add nodes, such as nodes 110a, 110b, and 110c to an organization network. In particular, on registering with the ISP, an organization network may be established with the organization id. The nodes 110a-110c may connect to the organization network to access web services offered by the ISP via the organization network. Although multiple organization nodes are described in the present example, however, in some cases a single organization node may be present within an organization. To this end, the organization network may connect to a first AS 102 network to avail services from the ISP and further provide services to the nodes 110a-c.

At 504, the first network device 114 receives organization data packets from the first organization 106. The organization data packet may indicate a destination as a second network device 116 associated with a second autonomous system 104. The first AS 102 may correspond to the organization network or may include multiple organization networks. Further, the second AS 104 may correspond to a destination organization network, for example, belonging to an associated network device of the first organization 106. For example, the organization data packets may conform to an IP type provided in the service information and may require service pertaining to the service type indicated in the service information. In an example, the first network device 114 may receive the organization data packets from a node from the nodes 110a-110c within the first organization 106.

At 506, the first network device 114 sends a first service message to discover peer network devices. The first service message may include data relating to the 'REACH' operation to initiate probing or discovery of any peer router. The probing is performed based on a pre-configured port at which the peer router may be listening for the communication session (i.e., OTGP session). For example, the 'REACH' service message may include a 'Hello' data packet for discovering the peer router and checking whether the peer router is listening on the pre-configured OTGP communication port. Based on the 'REACH' operation, the first network device 114 may determine the number of hops to reach the second network device 116 and latency in forming a connection between the first network device 114 and the second network device 116 via the peer routers.

As may be understood, in some cases, the second network device 116 may be directly connected, i.e., the second network device 116 may be a peer router of the first network device 114. In another case, the second network device 116 may be remotely connected to the first network device 114. In such a case, the organization data packets may hop from the peer router to the second network device 116 or may hop from the peer router to another one or more OTGP edge routers to reach the second network device 116. In yet another case, the first network device 114 may fail to determine a route to reach the second network device 116. In such a case, the first network device 114 may determine whether a gateway of last resort is available to configure the first network device 114 to route on a default route. In this regard, when the first network device 114 has a default route, the organization data packets may be forwarded to the gateway of last resort; and when the first network device 114 does not have a default route, the organization data packets may be discarded, and an unreachable message may be sent back to a node from where the organization data packets were received.

At 508, the first network device 114 sends a second service message to negotiate connection parameters with a second network device 116. For example, the peer network device or the peer router may be listening on the pre-configured OTGP communication port and may form the preferred path or a part of the preferred path. The second service message may include data relating to the 'ATTEMPT' operation to perform negotiation of a set of attributes relating to data transfer, between the first network device 114 and the peer network device. For example, the 'ATTEMPT' service message may include a 'Confirming' data packet for negotiating a set of attributes with the peer network device. The set of attributes may be based on the service information, such as IP type, service type, cluster id, version identifier, and preferred path.

At 510, the first network device 114 sends a third service message to form a neighbor relationship link with the second network device 116. For example, the third service message relates to an 'INTERCONNECT' operation to establish the neighbor relationship link with the peer network device 116 based on at least the set of attributes. In an example, the 'INTERCONNECT' service message may include a 'Link' data packet for forming a neighbor relationship link with the peer network device and ensuring full reachability to it.

Thus, the first network device 114 establishes a communication session between the first network device 114 and the second network device 116. In particular, the first network device 114 determines a communication link between the first network device 114 and the second network device 116 to establish the communication session based on the OP routing information and the service type. The communication session may include a plurality of probable network paths. The plurality of probable network paths may be direct paths, such as the multiple connections 308a-308d, or may be formed via different routers positioned between the first network device 114 and the second network device 116.

For example, the OP routing information includes an OP routing table, an OP service table, and an OP link table. The OP routing table may maintain a plurality of organization identifiers associated with a plurality of organizations that the first network device 114 may know and how to reach or route to the plurality of organizations. For example, if the OP routing table includes six organization identifiers corresponding to six organizations, then the first network device 114 knows how to reach each of the six organizations, for example using which vendor identifier for packet forwarding. Subsequently, in OTGP protocol, the OP routing table indicates organization identifiers used to determine hops of a data packet.

Further, the OP service table indicates all services in use or available to use on all edge routers, i.e., what services are supported by different OTGP edge network devices along each of the routes to reach various organizations that are indicated in the OP routing table. This enables the first network device 114 to determine which path or route will fulfill customer or organization requirements. For example, the OP routing table of the first network device 114 includes 2 organizations, i.e., ORG1 and ORG2, and the OP service table indicates the service of VPN and internet services. Further, if a service requirement of the organization within the first AS 102 is of VPN, then the first network device 114 may select the path which has service links of VPN in between them. It may be noted that data packets from different organizations and having different service requirements are forwarded in the data plane. Therefore, when VPN is selected, that means the data plane is optimized for VPN traffic only. Moreover, the OP link table may include a list of all active connected neighbors with service within a vendor identifier network of the first network device 114. The OP link table may also include all other high availability paths for the neighbors. For example, the OP routing information is updated based on the service information.

At 512, the first network device 114 calculates a connection metric value for each of the plurality of probable network paths for reaching the second network device 116, based on a set of connection parameters. In one example, a connection metric value for a first probable network path may be determined by performing a mathematical operation on values corresponding to the set of connection parameters for the first network path.

In particular, a mathematical formula used for calculating a connection metric value for the first probable network path is:

$$\text{Connection metric value} = \frac{\text{number of hops} \times \text{latency} \times \text{service type}}{Ks \times \text{bandwidth} \times 100} \qquad \text{Eqn. (2)}$$

Herein, the number of hops may indicate a number of routers that may have to be hopped before reaching the second network device 116, via the first probable network path. A value of latency may indicate delay per hop for the organization data packets. Such delay may be caused due to mechanisms that handle, for example, listening before talking (LBT), re-transmission, and handshaking. The value of latency may indicate a total delay across the number of hops to reach the second network device 116. A value of bandwidth may indicate the speed at which organization data packets may be transmitted over the first path or portions constituting the first probable network path. The bandwidth may be measured in terms of the number of bits that are transferred over a channel per second.

Further, the $K_s$ is a device constant, and a value of the $K_s$ may be based on a hardware model of the first network device 114 and/or the second network device 116. Moreover, a value of service type may be pre-determined based on the service information. The value of service type may also depend on the hardware model of the first network device 114. In an example, the first network device 114 may be operating on 6 core Linux workstation. In such a case, the values of $K_s$ for different types of organization packets are provided below in table 1. The values of $K_s$ and service type may change based on IP type of organization data packets, dedicated hardware like routers, and its different variants.

TABLE 1

Values of Ks and service type based on different organization data packets for a 6 core Linux hardware

| Type of data packet | Ks | Service type value |
|---|---|---|
| IPV4 | 1.09 | 10 |
| IPV6 | 4.9 | 50 |
| VPN [Generic transport mode] | 101.2 | 100 |
| IPSEC | 7.962 | 80 |
| Multicast | 1.8889 | 20 |
| Audio only | 3.010 | 30 |
| Video codec | 6.90 | 70 |
| Conferencing | 9.13 | 90 |
| Ethernet frames | 6.12 | 60 |
| Best Effort | 40 | 40 |

Thus, the connection metric value is directly proportional to the latency value and the service type. In other words, the connection metric value is calculated by considering the service type with latency keeping resources in mind.

In a similar manner, a connection metric value for each of the plurality of probable network paths may be calculated. For example, a probable network path from the plurality of probable network paths having the lowest connection metric value may win and is selected as the preferred network path. After identifying the preferred network path, a linked network path is established between the first network device 114 and the second network device 116. Thereafter, actual network traffic/routing tables are exchanged between the first and second network devices.

At 514, the first network device 114 establishes a linked network interface with the second network device 116 through a plurality of intermediate network devices. To ensure high availability in the network architecture, multiple probable network paths or probable network interfaces may be provided for a single service type. For example, multiple probable network interfaces may exist between the first network device 114 and the peer network device. Based on the preferred network path, one of the multiple probable network interfaces may be activated. In this manner, a probable network interface may be converted to a link state, i.e., form a linked network interface between the first network device 114 and the peer network device. It may be understood, if the peer network device corresponds to the second network device 116, the linked network interface between the first network device 114 and the peer network device may form the complete linked network path. If the peer network device does not correspond to the second network device 116 and the organization data packets have to be routed through the peer network device, linked network interface between the first network device 114 and the peer network device may form a portion of the complete linked network path. In such a case, the peer network device may form a linked network interface with other peer routers to reach the second network device 116 based on the preferred network path.

In an example, the preferred network path may be user-selected and may be explicitly configured by a user or a network administrator of the organization, for example, by changing a preferred path value.

At 516, the first network device 114 sends a route advertisement to the second network device 116. The route advertisement may be sent over an active path, i.e., the linked network path that may be established based on the preferred path and service type selected by the organization. In an example, the linked network path may be determined based on a principle that routes advertised on a path will not be used for route advertisement, i.e., if route advertisement is sent from the first network device 114 to the second network device 116 on the linked network path, then the linked network path may not be used to reverse-forward the route advertisement from the second network device 116 back to the first network device 114. In an example, the route advertisement may include the OP routing information. The first network device 114 may access the OP routing information from a database of an ISP associated with the first AS 102, or may be injected with the OP routing information by a network administrator during set-up. The first network device 114 may maintain the OP routing information within a memory associated therewith, or on the cloud, such as SD-WAN.

For example, the first network device 114 may send the route advertisement as a service message, i.e., a fourth service message that indicates the 'NETWORK' operation to initiate data transfer between the first network device 114 and the peer network device. For example, a body of the NETWORK service message may include the OP routing information for routing of the organization data packets. The 'NETWORK' service message may also be used to exchange organization protocol (OP) IP route, frames information, VPN information, and so forth.

At 518, the first network device 114 sends a connection request to the second network device 116 to establish a phase 1 IPSec tunnel. In an example, the linked network path is implemented as an IPSec communication tunnel. Although the embodiments in the present disclose establishing IPSec service configuration-based linked network path. However, it should not be construed as a limitation. In other examples of the present disclosure, the linked network path may be based on generic routing encapsulation (GRE) configuration, IPIP configuration, virtual extensible LAN (VXLAN), dynamic multipoint VPN (DMVPN), or any other open standards for the communication channel. The connection request includes the cryptographic key data structure and the service information. For example, the connection request may also be sent to the peer network device lying between the first network device 114 and the second network device 116, i.e., on the preferred path between the first network device 114 and the second network device 116.

At 520, the second network device 116 completes the phase 1 IPsec tunnel, based on the connection request. Further, the second network device 116 completes the linked network path using the cryptographic key data structure. In an example, the cryptographic key data structure may be a hash table. In such a case, the second network device 116 uses a hash table value for encryption methods and establishes a secure IPsec tunnel. It may be noted that the peer network device between the first network device 114 and the second network device 116, through which the connection request may be routed, may contribute to building the IPsec tunnel dynamically based on the cryptographic key data structure.

At 522, the second network device 116 sends a response to the first network device 114 upon completing the IPsec tunnel. For example, the second network device 116 sends the response back to the source, i.e., the first network device 114 to notify it that phase 1 is complete. The response may also include a security key associated with the cryptographic key data structure, based on which the phase 1 IPsec tunnel is built. By sending the response, the second network device 116 may indicate activation of the preferred path. Once activated, the preferred path may be converted to a linked network path. In particular, the linked network path may be one of the plurality of probable network paths that is in link state or activated.

At 524, the first network device 114 encrypts the organization data packets. For example, the first network device 114 may encrypt the organization data packets based on the security key returned by the second network device 116 and/or the cryptographic key data structure values. Further, the first network device 114 may encrypt the organization data packets based on the organization identifier associated with the organization. In certain cases, the first network device 114 may retrieve a device identifier associated with a node that sends the organization data packets and further encrypts the organization data packets based on the device identifier of the node. The device identifier may be, for example, the MAC address of the node.

At 526, the first network device 114 sends the encrypted organization data packets to the second network device 116, via the linked network path. In an example, the first network device 114 may send the encrypted organization data packets to the peer network device. If the peer network device corresponds to the second network device 116, it may further forward the organization data packets to a node within the second AS, i.e., the destination node. If the peer network device does not correspond to the second network device 116, it may determine the destination address of the organization data packets and may further route the organization data packets to another edge network device that may be positioned between the peer network device and the second network device 116.

Figure 6:
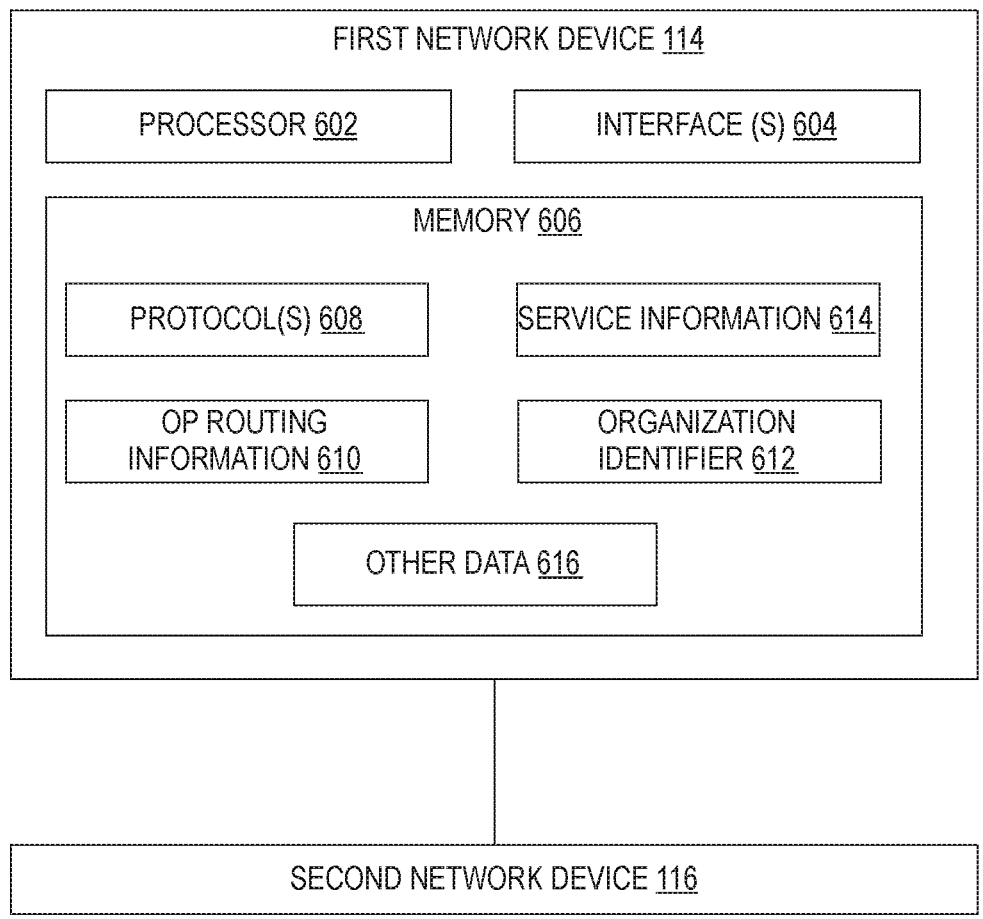
FIG. 6 illustrates a block diagram representation of a network device capable of implementing various embodiments of the present disclosure.

FIG. 6 illustrates a block diagram representation 600 of a first network device 114 connected to a second network device 116 capable of implementing various embodiments of the present disclosure. In the present example, the first network device 114 includes processor 602, interface 604, and memory 606. The processor 602, the interface 604, and the memory 606 may be connected to each other by using a bus. In this embodiment of the present disclosure, the processor 602 is configured to control and manage an action of the first network device 114. For example, the processor 602 is configured to perform steps 202-208 in FIG. 2, steps 502-526 in FIG. 5, and/or another process of the technology described in this specification. The interface 604 is configured to support communication of the first network device 114. The memory 606 is configured to store program code and data of the first network device 114.

The processor 602 may be a central processing unit, a general-purpose processor, a digital signal processor, an application-specific integrated circuit, a field-programmable gate array, or another programmable logic device, a transistor logic device, a hardware component, or any combination thereof. The processor 602 may implement or execute various example logical blocks, modules, and circuits described with reference to content disclosed in this application. Alternatively, the processor 602 may be a combination for implementing a computing function, for example, a combination of one or more microprocessors, or a combination of a digital signal processor and a microprocessor.

The memory 606 may be computer-operated hardware suitable for storing and/or retrieving data, such as but not limited to, protocol(s) 608, OP routing information 610, organization identifier 612, service information 614, and other data 616. The memory 606 may include multiple storage units such as hard disks and/or solid-state disks in a redundant array of inexpensive disks (RAID) configuration. The memory 606 may include a storage area network (SAN) and/or a network-attached storage (NAS) system. In some alternate embodiments, the memory 606 may also include magnetic storage devices (such as hard disk drives, floppy disks, magnetic tapes, etc.), optical magnetic storage devices (e.g., magneto-optical disks), semiconductor memories (such as mask ROM, PROM (programmable ROM), EPROM (erasable PROM), Phase-change memory, flash ROM, RAM (random access memory)), etc.

In some embodiments, the memory 606 is integrated within the first network device 114. For example, the first network device 114 may include one or more hard disk drives as the memory 606. In other embodiments, the memory 606 is external to the first network device 114 and may be accessed by the first network device 114 using a bus. The bus may be a peripheral component interconnect (Peripheral Component Interconnect, PCI) bus or an extended industry standard architecture (Extended Industry Standard Architecture, EISA) bus, or the like. The bus may be classified into an address bus, a data bus, a control bus, and the like.

In operation, the processor 602 of the first network device 114 may access organization packet (OP) routing information 610 and service information 614 relating to an organization associated with a first autonomous system 102 within which the first network device 114 operates. The processor 602 may access the OP routing information 610 and the service information 614 based at least on the organization identifier 612 of the organization. Further, the service information 614 may indicate a service type associated with the organization. For example, the processor 902 may retrieve organization identifier 612 from a computing node associated with the organization, or an ISP associated with the first network device 114 with which the organization may have registered. Further, the service information 614 may indicate a service type selected by the organization for routing data packets from the organization to the corresponding destination address.

The processor 602 further receives an organization data packet from the organization. The organization data packet indicates the second network device 116 associated with a second autonomous system 104. The second network device may be indicated as the destination address of the organization data packet. For example, the organization associated with the first autonomous system 102 and the first network device 114 may include a first set of nodes. Subsequently, the processor 602 may receive the organization data packet from a node from the first set of nodes. The organization data packet may have an associated OP header that may indicate a value of the service type selected by the organization.

The processor 602 further determines a communication link between the first network device 114 and the second network device 116, based on the OP routing information and the service type. For example, the connection link may indicate if the first network device 114 and the second network device 116 are directly connected or remotely, and via wired or wireless connection means. The communication link may include a plurality of paths. For example, the plurality of paths may be a redundant path for high availability and/or may be facilitated by different network devices positioned between the first network device 114 and the second network device 116. For example, such reachability information may be defined within the OP route table, OP service table, and OP link table within the OP routing information.

Thereafter, the processor 602 determines a set of connection metric values for the communication link. In particular, the processor 602 determines a connection metric value corresponding to each of plurality of paths. The connection metric value for a first path from the plurality of paths may be determined based on the number of hops across the first path, latency across the first path, service type value, device constant, and bandwidth across the first path.

Based on the set of connection metric values, the processor 602 determines a linked network path. The linked network path is one of the plurality of probable network paths. The selected network path may have the lowest connection metric value. The processor 602 may then exchange service messages based on the selected preferred path to activate the communication session with the second network device 116. Upon activation, link state may be established on the preferred network path. The processor 602 may initiate transmission of the organization data packet to the second network device 116 via the linked network path.

The disclosed methods, operations, and/or the flow diagrams 200 and 500 as disclosed herein may be implemented using software including computer-executable stored on one or more computer-readable storage medium (e.g., non-transitory computer-readable medium, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, netbook, Webbook, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during implementation of the disclosed methods may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber-optic cable), magnetic communications, electromagnetic communications (including RF, microwave, and infrared communications), mobile communications, or other such communication means.

Further, the methods and/or operations may be practiced by a computer system including one or more processors and computer-readable media such as computer memory. In particular, the computer memory may store computer-executable instructions that when executed by one or more processors cause various functions to be performed, such as the acts recited in the above embodiments.

Embodiments of the present disclosure may include or utilize a special purpose or general-purpose computer including computer hardware, as discussed in greater detail below. Embodiments within the scope of the present disclosure also include physical and other computer-readable media for carrying or storing computer-executable instructions and/or data structures. Such computer-readable media may be any available media that may be accessed by a general-purpose or special-purpose computer system. Computer-readable media that store computer-executable instructions are physical storage media. Computer-readable media that carry computer-executable instructions are transmission media. Thus, by way of example, and not limitation, embodiments of the present disclosure can include at least two distinctly different kinds of computer-readable media: physical computer-readable storage media and transmission computer-readable media.

Physical computer-readable storage media includes RAM, ROM, EEPROM, CDROM or other optical disk storage (such as CDs, DVDs, etc.), magnetic disk storage or other magnetic storage devices, or any other medium which can be used to store desired program code means in the form of computer-executable instructions or data structures and which can be accessed by a general-purpose or special purpose computer.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
accessing, by a first network device of a first autonomous system, organization packet (OP) routing information and service information relating to an organization associated with the first autonomous system, the OP routing information and the service information being accessed based at least on an organization identifier of the organization and the service information indicating a service type associated with the organization;
sending, by the first network device, a plurality of service messages to establish a communication session with a second network device associated with a second autonomous system, the communication session comprising a plurality of probable network paths;
calculating, by the first network device, a connection metric value associated with each network path of the plurality of probable network paths based, at least in part, on a set of connection parameters;
identifying, by the first network device, a linked network path from the plurality of probable network paths based, at least in part, on the connection metric value associated with each network path of the plurality of probable network paths; and
upon identifying the linked network path, routing, by the first network device, organization data packets to the second network device via the linked network path;
wherein the communication session is in accordance with organization transit gateway protocol (OTGP);
wherein the set of connection parameters for each network path comprises a number of hops between the first network device and the second network device, a value of service type, device constant, latency across the network path, and bandwidth; and wherein
the linked network path is associated with a lowest connection metric value among connection metric values of the plurality of probable network paths.

2. The computer-implemented method of claim 1, further comprising:
sending, by the first network device, at least one service message comprising route advertisement to the second network device via the linked network path, the at least one service message having a packet header indicating the service type to activate the linked network path;
encrypting, by the first network device, the organization data packet based on the organization identifier; and
sending, by the first network device, the encrypted organization identifier to the second network device via the linked network path.

3. The computer-implemented method of claim 1, wherein the OP routing information comprises:
an Organization Protocol (OP) routing table indicating a list of a plurality of network devices associated with a plurality of autonomous systems and corresponding hops;
an OP service table indicating service types associated with the plurality of network devices; and
an OP link table indicating link information between the plurality of network devices.

4. The computer-implemented method of claim 3, further comprising:
updating, by the first network device, the OP link table based, at least in part, on the identified linked network path.

5. The computer-implemented method of claim 1, wherein the first network device and the second network device are configured with organization transit gateway protocol (OTGP).

6. A device comprising:
a memory;
an interface; and
a processor communicably coupled to the memory and the interface, wherein the memory stores instructions that configure the processor to perform at least in part to:
access organization packet (OP) routing information and service information relating to an organization associated with a first autonomous system, the OP routing information and the service information being accessed based at least on an organization identifier of the organization, and the service information indicating a service type associated with the organization;
send a plurality of service messages to establish a communication session with a network device associated with a second autonomous system, the communication session indicating a plurality of probable network paths;
calculate a connection metric value associated with each network path of the plurality of probable network paths based, at least in part, on a set of connection parameters;
identify a linked network path from the plurality of probable network paths based, at least in part, on the connection metric value associated with each network path of the plurality of probable network paths; and upon identification of the linked network path, route organization data packets to the network device via the linked network path; wherein the OP routing information comprises:

an Organization Protocol (OP) routing table indicating a list of a plurality of network devices associated with a plurality of autonomous systems and corresponding hops;

an OP service table indicating service types associated with the plurality of network devices; and an OP link table indicating link information between the plurality of network devices; and wherein the processor is further configured, at least in part, to:

send at least one service message comprising route advertisement to the network device via the linked network path, the at least one service message having a packet header, wherein the packet header indicates the service type to activate the preferred path;

encrypt the organization data packet based on the organization identifier;

send the encrypted organization identifier to the network device via the linked network path; and update the OP link table based, at least in part, on the identified linked network path; wherein the set of connection parameters comprises a number of hops between the device and the network device, a value of service type, a device constant, latency, and bandwidth; and wherein the linked network path is associated with a lowest connection metric value among the plurality of probable network paths.

7. A non-transitory machine-readable storage medium that provides instructions that, if executed by a processor of a device acting as a first organization transit gateway protocol (OTGP) network device associated with a first autonomous system, cause the processor to perform operations comprising:

accessing organization packet (OP) routing information and service information relating to an organization associated with the first autonomous system, the OP routing information and the service information being accessed based at least on an organization identifier of the organization, and the service information indicating a service type associated with the organization;

sending a plurality of service messages to establish a communication session with a second OTGP network device associated with a second autonomous system, the communication session indicating a plurality of probable network paths;

calculating a connection metric value associated with each network path of the plurality of probable network paths based, at least in part, on a set of connection parameters;

identifying a linked network path from the plurality of probable network paths based, at least in part, on the connection metric value associated with each network path of the plurality of probable network paths; and upon identifying the linked network path, routing organization data packets to the second OTGP network device via the linked network path; wherein the instructions that, if executed, further cause the processor to perform operations comprising:

sending at least one service message comprising route advertisement to the second OTGP network device via the linked network path, the at least one service message having a packet header, wherein the packet header indicates the service type to activate the preferred path;

encrypting the organization data packets based on the organization identifier; and sending the encrypted organization data packets to the second OTGP network device via the linked network path; wherein the linked network path is associated with a lowest connection metric value among the plurality of probable network paths; and wherein the set of connection parameters comprises a number of hops between the first network device and the second network device, a value of service type, a device constant, latency, and bandwidth.

8. The non-transitory machine-readable storage medium of claim 7, wherein the OP routing information comprise:

an Organization Protocol (OP) routing table indicating a list of a plurality of network devices associated with a plurality of autonomous systems and corresponding hops;

an OP service table indicating service types associated with the plurality of network devices; and an OP link table indicating link information between the plurality of network devices.

9. The non-transitory machine-readable storage medium of claim 8, wherein the instructions that, if executed, further cause the processor to perform operations comprising:

updating the OP link table based, at least in part, on the identified linked network path.

* * * * *